United States Patent [19]

Chaplin et al.

[11] Patent Number: 4,498,873
[45] Date of Patent: Feb. 12, 1985

[54] SURFACE EFFECT SHIP PROPELLER MOUNT

[75] Inventors: John B. Chaplin, Covington; Edward G. Ganczak, Slidell, both of La.

[73] Assignee: Textron Inc., Providence, R.I.

[21] Appl. No.: 507,131

[22] Filed: Jun. 23, 1983

[51] Int. Cl.³ .............................................. B63H 23/32
[52] U.S. Cl. ....................................... 440/82; 440/52; 248/634
[58] Field of Search .................... 440/52, 82; 114/356, 114/149, 288, 289; 244/54; 248/265, 632, 634, 638; 180/117, 119, 122

[56] References Cited

U.S. PATENT DOCUMENTS

| | | | |
|---|---|---|---|
| 669,804 | 3/1901 | Parsons et al. | 440/82 |
| 2,384,941 | 9/1945 | Lyons | 114/165 |
| 3,003,458 | 10/1961 | Starns, Jr. | 115/34 |
| 3,046,213 | 7/1962 | Benden | 204/196 |
| 3,169,105 | 2/1965 | Preiser et al. | 204/196 |
| 3,169,504 | 2/1965 | Gruber | 115/0.5 |
| 3,330,240 | 7/1967 | Hardy et al. | 180/117 |
| 3,428,017 | 2/1969 | Altson | 440/82 |
| 4,067,525 | 1/1978 | Allen | 248/632 |

FOREIGN PATENT DOCUMENTS

| | | | |
|---|---|---|---|
| 1188973 | 9/1959 | France | 440/82 |
| 110683 | 8/1980 | Japan | 440/82 |
| 698967 | 10/1953 | United Kingdom | 114/356 |

Primary Examiner—Trygve M. Blix
Assistant Examiner—Thomas J. Brahan
Attorney, Agent, or Firm—Bean, Kauffman & Bean

[57] ABSTRACT

There is disclosed in a surface effect ship which is constructed substantially of aluminum alloy material a hull construction including a side hull component which is bottomed by an operationally "wet" aluminum alloy keel plate, an improved propeller support arrangement comprising a superior strength thin-profile steel alloy strut extending cantilever-wise through the keel plate and carrying at its outer end bearing means for support of a ship propeller shaft. Interiorly of the side hull the steel strut is mechanically anchored to an operationally "dry" aluminum alloy member of the side hull structure, while at its underwater "wet" intersection with the aluminum alloy keel plate it is supported thereby but electrolytically and dynamically insulated therefrom by means of an epoxy-like housing device which at that cantilever support juncture encircles the strut.

6 Claims, 4 Drawing Figures

U.S. Patent  Feb. 12, 1985  4,498,873
Fig. 1.
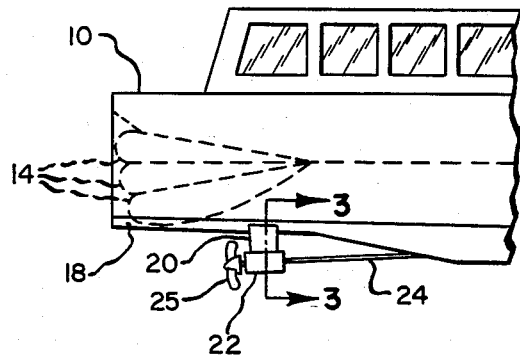
Fig. 2.
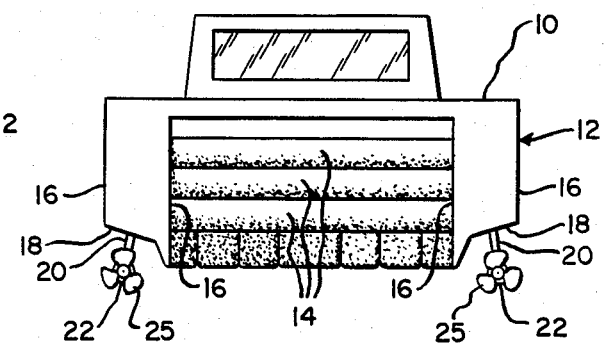
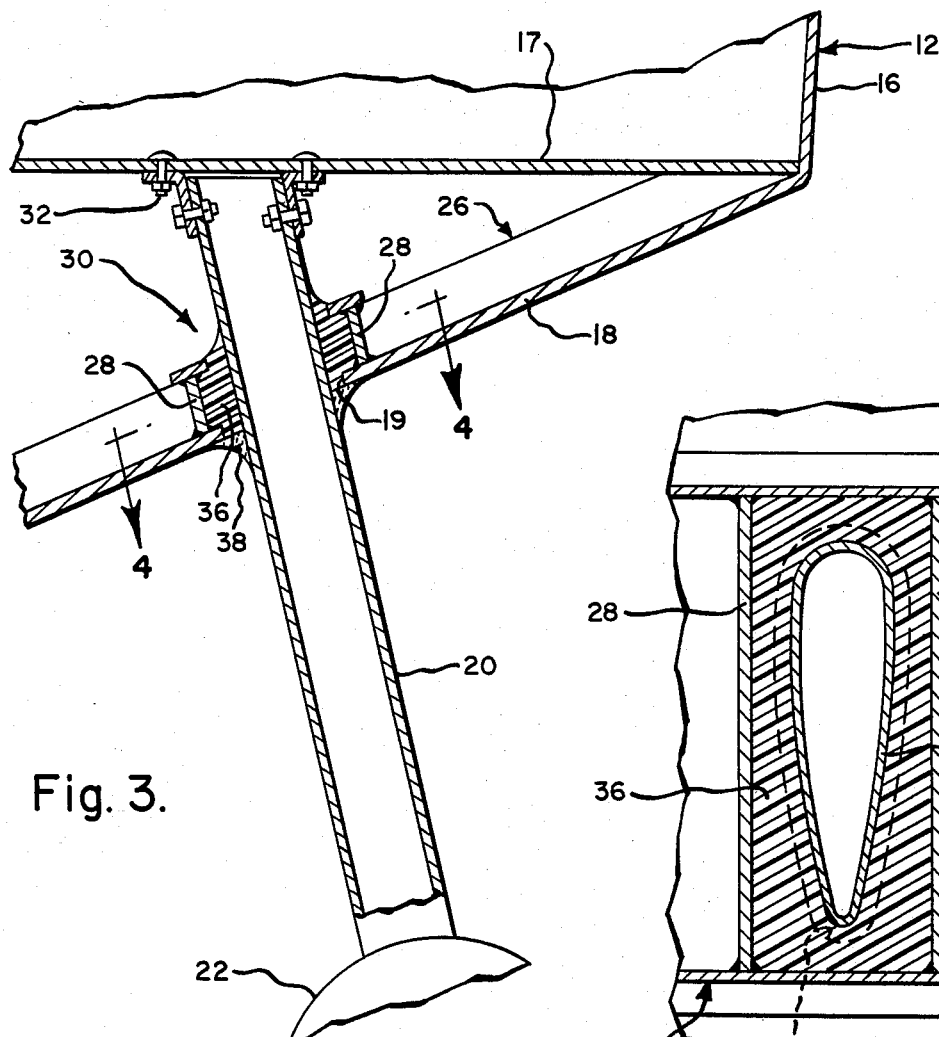
Fig. 3.
Fig. 4.
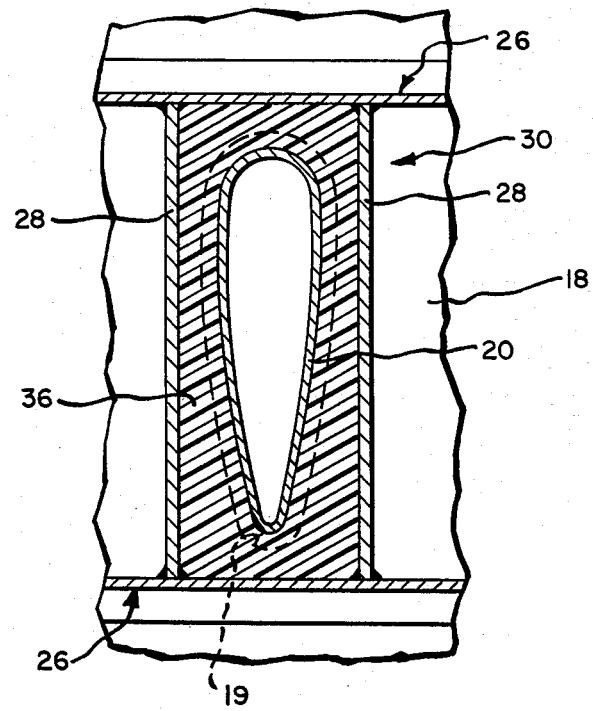

SURFACE EFFECT SHIP PROPELLER MOUNT

BACKGROUND AND OBJECT OF THE INVENTION

This invention relates to surface effect ship constructions, wherein aluminum alloy materials are largely used throughout the vessel hull and specifically are employed to construct the outside hull and hull bottom platings. Such vessels typically employ water propeller propulsion systems which are carried beneath the side hulls of the vessel by means of struts extending downwardly therefrom in laterally canted cantilever fashion. The cantilever base arrangement in this case is therefore called upon to combat a variety of omni-directionally related forces such as are imposed on the strut such as by cyclically imposed propeller operation vibrations; as well as forces imposed on the strut incidental to ship heave/roll and forward/reverse speed acceleration maneuverings of the ship and propeller groundings.

In order to provide the propeller support strut to be of minimum cross-sectional thickness (so as to minimize high speed operating drag effects) and to be of sufficient strength, such struts are required to be fabricated of high strength steel. The underwater junctures of such steel struts and aluminum alloy hull structures have therefore been vulnerable to dissimilar metal electrolytic corrosion effects with the result that the operational stresses thereon soon result in serious problems such as fatigue cracking of the supporting aluminum alloy based structure.

It is the object of the present invention to provide in an aluminum alloy hulled ship as aforesaid improvement in the method and means for mounting in cantilever extended relation below an aluminum alloy keel plate thereof a superior strength thin-profile steel strut, for operationally supporting the drive shaft of a ship propeller while avoiding the above referred to problems.

SUMMARY OF THE INVENTION

This invention provides an improved system for mounting in cantilever extended relation a superior strength thin-profile steel alloy strut from a side hull component of a ship hull construction employing substantially throughout aluminum alloy materials. The steel alloy strut carries at its outer end a ship propeller shaft, and is mechanically mounted at its hull-innermost end upon an aluminum alloy structural member and in spaced relation therewith is cantilever supported by but electrolytically insulated from a laterally sloping aluminum alloy keel plate component of the side hull. This avoids dissimilar metal electrolytic action at the "wet deck" keel plate and strut juncture, and also damps vibration effects induced into the strut system such as are caused by cyclically varying loadings thereon from the propeller and twisting/bending stresses on the strut connections to the side hull attending various ship maneuverings.

BRIEF DESCRIPTION OF THE DRAWINGS

The accompanying drawing illustrates a preferred mode of practicing the invention, wherein:

FIG. 1 is a fragmentary side elevational view of the stern portion of a typical surface effect ship which embodies an improved propeller carrying strut mounting arrangement of the present invention;

FIG. 2 is a rear end elevational view of the ship as illustrated in FIG. 1;

FIG. 3 is an enlarged scale fragmentary sectional view taken as suggested by line 3—3 of FIG. 1; and FIG. 4 is a fragmentary sectional view taken on line 4—4 of FIG. 3.

DETAILED SPECIFICATION

The invention is illustrated herewith as being embodied in a surface effect ship comprising generally a main hull portion 10 subtended by parallel side hull portions 12—12 (FIG. 2). As is conventional in the art, the air cushion cavity beneath the main hull 10 and between the side hulls 12—12 is sealed at the bow end of the vessel by any suitable means (not shown) and at its stern end for example by means of one or more inflated seal pillows as are shown at 14. As best shown at FIGS. 2 and 3, the bottom surfaces of the side hulls 12—12 are inclined upwardly in the outboard directions for ship operating stabilization purposes. Thus, as shown at FIG. 3, each of the side hulls 12 is constructed to include an outside wall plate 16; an inner cross plate or structural member 17 for structural stability purposes; and a sloping bottom or keel plate 18; all of which parts are fabricated of aluminum alloy plate material.

The bottom hull plate 18 of each side hull is apertured as shown at 19 (FIGS. 3 and 4) to accommodate passage therethrough of the propeller support steel strut 20. As shown at FIGS. 1 and 3, the strut 20 terminates in a bearing housing 22 which rotatably carries the drive shaft 24 of the propeller 25. The apertured portion 19 of the bottom plate is fore and aft bounded in spaced relation therefrom, as shown at FIGS. 3 and 4, by upright standing aluminum alloy stiffening ribs 26—26 which are welded to the bottom plate 18. Another pair of T-sectioned upstanding aluminum alloy side ribs 28—28 are also welded to the bottom plate 18 and at their opposite ends to the stiffening ribs 26—26 so as to extend in parallel relation at opposite sides of the strut 20 but in spaced relation therefrom. There is thus provided a "box" as is generally indicated at 30 which circumscribes in spaced relation therefrom the aperture 19 through the hull plate 18 and the strut 20. At its inner or upper end, the strut 20 is mechanically anchored by a mechanism shown at 32 (FIG. 3) to a side hull internal reinforcing plate 17 which extends at an angle from the keel plate 18.

The "box" 30 thus provides a fence into which is molded a body of an epoxy-like composition as indicated at 36 which peripherally encapsulates the strut 20, and which upon curing performs a combination of functions. It water-seals the aperture 19 through the hull plate 18, and provides strut 20 with a second support in the region of the hull plate, which cooperates with anchor mechanism 32 to support the strut to extend in cantilever relation from the bottom of the side hull structure. It also operates to damp vibration stresses traveling upwardly through the strut such as result from cyclic pulses generated by the propeller operation and ship heave/roll and forward/reverse speed accelerations attending various maneuverings of the ship, as well as propeller grounding shock forces. Furthermore, the contents of the "box" 30 insulates the aluminum alloy hull plate 18 and the steel strut 20 against dissimilar metal electrolytic action thereon such as would otherwise corrode and deteriorate the strength effectiveness of the propeller strut mounting system. As shown at 38 (FIG. 3) a sealing filet may preferably be added to cover the space between the strut 20 and the keel plate 18; the filet 38 being made from an epoxy material selected for its bonding capability rather than its chocking capability.

The fence filler material as shown at 36 may comprise any suitable 100 percent solids, two-component type material such as may be referred to as a casting or chocking compound. The material should be readily pourable and upon curing have resilient, electrically non-conducting and vibration damping capabilities, as well as being by nature waterproof, adhesive to metals and chemically inert to sea water. By way of example, an epoxy type composition such as is currently available on the market and is known under the trademark "CHOCK FAST ORANGE" PR-610-TCF, manufactured by the Philadelphia Resin Co., has been found to be suitable to provide the "filler" 36 for the support juncture for the purposes of this invention. However, it is to be understood that any other "mix" formulated so as to provide upon curing the properties referred to may be employed as the box filler in accordance with the invention. Whereas the "box" 30 enclosing the strut supporting epoxy type material 36 is shown herein as being in plan view of squared configuration, it will of course be understood that the fence enclosing the insulating/bearing/sealing and vibration damping material may be of any other suitable and/or preferred configuration.

What is claimed is:

1. A ship having a hull including a side hull bottomed by an underwater operationally wet aluminum alloy keel plate having an opening extending therethrough and an interior operationally dry aluminum alloy structural member;
   a steel strut having an inner end mechanically anchored to said structural member and an outer end for supporting bearing means for carrying a ship propeller shaft, said strut freely extending through said opening;
   a fence formed of aluminum alloy and fixed to said keel plate within said side hull and arranged to surround said opening and said strut in spaced relationship therefrom; and
   a solid but somewhat resilient body of material chemically inert to sea water filling said fence about said strut to water-seal said opening and provide said strut with a support in the region of said keel plate for dampening vibrational stress traveling through said strut and avoiding dissimilar metal sea water electrolytic action between said strut and said keel plate.

2. A ship as set forth in claim 1, wherein said resilient body is cast in place within said fence to encapsulate said strut.

3. A ship as set forth in claim 2, wherein said fence is defined by a pair of fore and aft arranged aluminum alloy stiffening ribs welded to said keel plate and a pair of aluminum alloy side ribs welded to said keel plate and at their opposite ends to said stiffening ribs.

4. A ship as set forth in claim 1 wherein said solid but resilient body comprises an epoxy type composition.

5. A ship as set forth in claim 1 wherein said solid but resilient body is electrically non-conducting.

6. A ship as set forth in claim 1 wherein said solid but resilient body is adhesive to metals.

* * * * *